US007828936B2

(12) United States Patent
Luo et al.

(10) Patent No.: US 7,828,936 B2
(45) Date of Patent: Nov. 9, 2010

(54) DISSOLUTION OF CELLULOSE IN MIXED SOLVENT SYSTEMS

(75) Inventors: Mengkui Luo, Federal Way, WA (US); Amar N Neogi, Kenmore, WA (US); Hugh West, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 86 days.

(21) Appl. No.: 12/240,679

(22) Filed: Sep. 29, 2008

(65) Prior Publication Data

US 2009/0088564 A1 Apr. 2, 2009

Related U.S. Application Data

(60) Provisional application No. 60/976,221, filed on Sep. 28, 2007.

(51) Int. Cl.
*D21H 13/00* (2006.01)

(52) U.S. Cl. .................................... 162/176; 162/157.6

(58) Field of Classification Search ................. 162/167, 162/9

See application file for complete search history.

(56) References Cited

U.S. PATENT DOCUMENTS

| | | | | |
|---|---|---|---|---|
| 6,482,940 | B1 | 11/2002 | Klohr et al. | |
| 2006/0090271 | A1 * | 5/2006 | Price et al. | 8/490 |
| 2008/0135193 | A1 * | 6/2008 | Kokko | 162/9 |
| 2008/0173418 | A1 | 7/2008 | Sumnicht | |

FOREIGN PATENT DOCUMENTS

WO WO 2007032022 A2 * 3/2007

* cited by examiner

*Primary Examiner*—Eric Hug
*Assistant Examiner*—Jacob Thomas Minskey
(74) *Attorney, Agent, or Firm*—John M. Crawford

(57) ABSTRACT

A method for dissolving cellulose in which the cellulose based raw material is admixed with a mixture of a dipolar aprotic intercrystalline swelling agent and an ionic liquid at a temperature of 25° C. to 180° C. for a time sufficient to dissolve the cellulose based raw material. The molar ratio of dipolar aprotic intercrystalline swelling agent to ionic liquid is 0.05 to 1.5 moles of dipolar aprotic intercrystalline swelling agent to 1 mole of ionic liquid. Dipolar aprotic intercrystalline swelling agents do not include imidazole based agents or amine based agents.

11 Claims, No Drawings

DISSOLUTION OF CELLULOSE IN MIXED SOLVENT SYSTEMS

This application claims priority from Provisional Application 60/976,221 filed Sep. 28, 2007.

FIELD

This application relates to the dissolution of cellulose in a mixture of dipolar aprotic intercrystalline swelling agents and ionic liquids. Further, it relates to the dissolution of cellulose in a mixture of protic intercrystalline swelling agents and ionic liquids.

DESCRIPTION

As the current world demand for cellulose increases, there is an increasing demand for low cost raw materials which can be used in commercial processes that use these raw materials. Additionally, there is a need to develop new processes which use these raw materials and which are simpler, have less of an environmental impact and do not have some of the shortcomings of the current processes.

Solvents for the dissolution of cellulose and other constituents in trees and other woody and non-woody plants are increasingly important in order to maximize the utilization of the components in their entirety. Increased use of textiles, fibers, films, membranes and other products dictate the need for new solvent systems which can help meet demands in these areas. Manufacturing facilities with these solvent systems must be have low capital costs and must meet environmental and regulatory laws.

Currently rayon and lyocell are commercially available cellulose fibers. Rayon is made in the viscose process. In the process, cellulose is first steeped in a mercerizing strength caustic soda solution to form an alkali cellulose. This is reacted with carbon disulfide to form cellulose xanthate which is then dissolved in dilute caustic soda solution. After filtration and deaeration the xanthate solution is extruded from submerged spinnerets into a regenerating bath of sulfuric acid, sodium sulfate, zinc sulfate, and glucose to form continuous filaments. The resulting viscose rayon is presently used in textiles and has been used in such applications as tires and drive belts.

Cellulose is also soluble in a solution of ammonia copper oxide. This property forms the basis for production of cuprammonium rayon. The cellulose solution is forced through submerged spinnerets into a solution of 5% caustic soda or dilute sulfuric acid to form the fibers, which are then decoppered and washed. Cuprammonium rayon can be available in fibers of very low deniers and is used almost exclusively in nonwoven wipe application.

The foregoing processes for preparing rayon both require that the cellulose be chemically derivatized or complexed in order to render it soluble and therefore capable of being spun into fibers. In the viscose process, the cellulose is derivatized, while in the cuprammonium rayon process, the cellulose is complexed. In either process, the derivatized or complexed cellulose must be regenerated and the reagents that were used to solubilize it must be removed. The derivatization and regeneration steps in the production of rayon significantly add to the cost of this form of cellulose fiber and also possess environmental issues in the use of zinc in coagulation baths and in the handling of carbon disulfide. Consequently, in recent years attempts have been made to identify solvents that are capable of dissolving underivatized cellulose to form a dope of underivatized cellulose from which fibers can be spun.

One class of organic solvents useful for dissolving cellulose are the amine-N oxides, in particular the tertiary amine-N oxides. Lyocell is made by dissolving cellulose in a mixture of N-methylmorpholine-N-oxide (NMMO) and water and extruding the solution into regenerating bath, usually water.

Lyocell is a generic term for a fiber composed of cellulose precipitated from an organic solution in which no substitution of hydroxyl groups takes place and no chemical intermediates are formed. Several manufacturers presently produce lyocell fibers, principally for use in the textile industry. For example, Lenzing, Ltd. presently manufactures and sells a lyocell fiber called Tencel® fiber.

Currently available lyocell fibers and high performance rayon fibers are produced from high quality wood pulps that have been extensively processed to remove non-cellulose components, especially hemicellulose. These highly processed pulps are referred to as dissolving grade or high a (or high alpha) pulps, where the term a (or alpha) refers to the percentage of cellulose remaining after extraction with 17.5% caustic. Alpha cellulose can be determined by TAPPI 203. Thus, a high alpha pulp contains a high percentage of cellulose, and a correspondingly low percentage of other components, especially hemicellulose. The processing required to generate a high alpha pulp significantly adds to the cost of rayon and lyocell fibers and products manufactured therefrom. Typically, the cellulose for these high alpha pulps comes from both hardwoods and softwoods; softwoods generally have longer fibers than hardwoods.

A wide variety of cellulose based raw materials can be used in the present application. Chemical pulp fibers used in the present application are derived primarily from wood pulp. Other sources such as from kenaf and straw pulp may also be used. Suitable wood pulp fibers for use with the application can be obtained from well-known chemical processes such as the kraft and sulfite processes, with or without subsequent bleaching. Softwoods and hardwoods can be used. Details of the selection of wood pulp fibers are well known to those skilled in the art. For example, suitable cellulosic fibers (chemical pulp fibers) produced from southern pine that are useable in the present application are available from a number of companies including Weyerhaeuser Company under the designations C-Pine, Chinook, CF416, FR416, and NB416. A Prince Albert Softwood and Grande Prairie Softwood, manufactured by Weyerhaeuser are examples of northern softwoods that can be used. Mechanically and chemimechanically treated fibers such as chemithermomechanical pulp fibers (CTMP), bleached chemithermomechanical pulp fibers (BCTMP), thermomechanical pulp fibers (TMP), refiner groundwood pulp fibers and groundwood pulp fibers can also be used. Examples of these pulps are TMP (thermomechanical pulp) made by Bowater, Greenville, S.C., a TMP (thermomechanical pulp) made by Weyerhaeuser, Federal Way, Wash., made by passing wood chips through three stages of dual refiners, and a CTMP (chemithermomechanical pulp) obtained from NORPAC, Longview, Wash., sold as a CTMP NORPAC Newsprint Grade with a brightness from 53 to 75.

Ionic liquids such as 1-ethyl-3-methylimidizolium acetate (EMIMAc) and 1-butyl-3-methyl imidazoliumchloride (BMIMCl) are known to dissolve cellulose. It has now been found that the solubility of cellulose is increased in mixtures of dipolar aprotic intercrystalline swelling agents and ionic liquids. Similar effects are noted when cellulose is dissolved in a mixture of a protic solvent and an ionic liquid.

Dipolar aprotic intercrystalline swelling agents include but are not limited to dimethyl sulfoxide (DMSO), dimethyl acetamide (DMAc), N-methylmorpholine oxide, formamide, pyridine, acetone, dioxane, N-methyl pyrolidine (NMP), piperylene sulfone and hexamethylphosphoramide (HMPA). These dipolar aprotic intercrystalline swelling agents, by themselves, do not dissolve cellulose. In general, it is thought that liquids which produce a significant amount of swelling are those that are capable of forming hydrogen bonded complexes with the cellulose molecule. Dipolar aprotic intercrystalline swelling agents do not include imidazole based agents or amine based agents.

Protic solvents include but are not limited to water, low molecular alcohols such as methyl, ethyl, propyl, butyl and amyl alcohol, ethylene glycol, acetic acid, methylamine, di- and triethylamine and butylamine and mixtures thereof.

As defined herein, ionic liquids are ionic compounds which are liquid below 100° C. A few ionic liquids for cellulose have melting points below room temperatures, some even below 0° C. The compounds are liquid over a wide temperature range from the melting point to the decomposition temperature of the ionic liquid. Ionic liquids have cations or anions associated with the molecule. Examples of the cation moiety of ionic liquids are cations from the group consisting of cyclic and acyclic cations. Cyclic cations include pyridinium, imidazolium, and imidazole and acyclic cations include alkyl quaternary ammonium and alkyl quaternary phosphorous cations. Counter anions of the cation moiety are selected from the group consisting of halogen, pseudohalogen and carboxylate. Carboxylates include acetate, citrate, malate, maleate, formate, and oxylate and halogens include chloride, bromide, zinc chloride/choline chloride, 3-methyl-N-butyl-pyridinium chloride and benzyldimethyl (tetradecyl) ammonium chloride. Substituent groups, (i.e. R groups), on the cations can be $C_1$, $C_2$, $C_3$, and $C_4$; these can be saturated or unsaturated. Examples of compounds which are ionic liquids include, but are not limited to, 1-ethyl-3-methyl imidazolium chloride, 1-ethyl-3-methyl imidazolium acetate, 1-butyl-3-methyl imidazolium chloride, 1-allyl-3-methyl imidazolium chloride, zinc chloride/choline chloride, 3-methyl-N-butyl-pyridinium chloride, benzyldimethyl(tetradecyl) ammonium chloride and 1-methylimidazolehydrochloride. The 1-ethyl-3-methyl imidazolium acetate used in this work was obtained from Sigma Aldrich, Milwaukee.

In one embodiment cellulose is dissolved in a mixture of a dipolar aprotic agent and an ionic liquid. Mixtures of the dipolar aprotic agent and the ionic liquid dissolve cellulose over a wide temperature range. In one embodiment cellulose is dissolved in the range of 25° C. to 180° C. In another embodiment cellulose is dissolved over the range of 80° C. to 120° C. In yet another embodiment cellulose is dissolved over a temperature range of from 100° C. to 110° C. Dissolution of cellulose can be conducted with or without stirring. The latter accelerates dissolution of cellulose. Table 1 shows the dissolution of cellulose (10% weight add on of Peach® on total weight of mixture of dipolar aprotic agent and ionic liquid) in a mixture of dipolar aprotic agents and ionic liquids at 105° C.; Table 2 shows the dissolution of cellulose (10% weight Peach® add on) in a mixture of dipolar aprotic agents and ionic liquids at 105° C. with stirring. For purposes of this application, cellulose is considered dissolved when the solution is visually examined and is cloudy or clear. The dissolution of cellulose is further confirmed by casting the cellulose dope on a glass slide to form a film and regenerating the film in water. In the tables, molar ratio refers to the ratio of the dipolar aprotic agent to the ionic liquid. For example a molar ratio of 10.27 for the mixture of DMSO and EMIMAc (1-ethyl-3-methyl imidazolium acetate) means that 10.27 moles of DMSO and one mole of EMIMAc dissolve cellulose at 105° C. in one hour.

Cellulose is dissolved over a wide range of molar ratios of the dipolar aprotic solvent to the ionic liquid. For ionic liquids that are liquids, the calculated amount of dipolar aprotic solvent was added to the ionic liquid, mixed and a fixed quantity of cellulose was added. For ionic liquids that are solids, the ionic liquid was heated to melt the solid, the calculated amount of a dipolar aprotic solvent was added to the ionic liquid, mixed and a fixed quantity of cellulose was added. Heating was conducted in a sealed vial at 105° C. for samples that were not stirred and at 105° C. with occasional stirring with a spatula after opening the heated sealed vial. In some cases dissolution was conducted as low as 25° C. if the solvent mixture is a solution at room temperature.

In some embodiments the molar ratio Of dipolar aprotic intercrystalline swelling agent to ionic liquid may be from 0.5 to 25 moles of dipolar aprotic intercrystalline swelling agent to 1 mole of ionic liquid. In some embodiments the molar ratio of dipolar aprotic intercrystalline swelling agent to ionic liquid may be from 0.5 to 15 moles of dipolar aprotic intercrystalline swelling agent to 1 mole of ionic liquid. In some embodiments the molar ratio of dipolar aprotic intercrystalline swelling agent to ionic liquid may be from 0.5 to 2 moles of dipolar aprotic intercrystalline swelling agent to 1 mole of ionic liquid. In one embodiment a molar ratio of 10.27 for the mixture of DMSO and EMIMAc (1-ethyl-3-methyl imidazolium acetate) dissolves cellulose in one hour at 105° C. In another embodiment a molar ratio of 1.25 for the mixture of DMSO and EMIMCl (1-ethyl-3-methyl imidazolium chloride) dissolves cellulose at 105° C. in 20 hours. In one embodiment a molar ratio of 0.8 for the mixture of DMSO and EMIMCl (1-ethyl-3-methyl imidazolium chloride) dissolves cellulose in 45 minutes at 105° C. with stirring. In another embodiment a molar ratio of 1.7 for the mixture of DMAc and BMIMCl (1-butyl-3-methyl imidazolium chloride) dissolves cellulose at 105° C. in 30 minutes with stirring.

In some embodiments the time of dissolution for mixtures of dipolar aprotic agents and ionic liquids may be 5 minutes to 24 hours. In some embodiments the time of dissolution for mixtures of dipolar aprotic agents and ionic liquids may be 5 minutes to 1 hours.

Mixtures of the dipolar aprotic agents and ionic liquids have a surprising effect on viscosity and exhibit Newtonian flow characteristics. Viscosity was determined at a different shear rates with a rotational rheometer from Bohlin (Viscometry Mode at room temperature) Table 4, 5 and 6 show the effect on viscosity (Pas, pascal seconds) at different shear rates (second$^{-1}$) of cellulose dissolved in a mixture dipolar aprotic intercrystalline swelling agents and ionic liquids. The tables show that with increasing shear rate the viscosity decreases. This is particularly beneficial where throughput in manufacturing is important since more weight per unit time can be achieved through the spinning head.

In another embodiment cellulose is dissolved in a mixture of a protic solvent and an ionic liquid. Protic solvents include but are not limited to water, low molecular alcohols such as methyl, ethyl, propyl, butyl and amyl alcohol, ethylene glycol, acetic acid, quaternary ammonium hydroxide, quaternary ammonium cations, methylamine, di- and triethylamine and butylamine and mixtures thereof. For ionic liquids that are liquids, the calculated amount of protic agent was added to the ionic liquid, mixed and a fixed quantity of cellulose was added. For ionic liquids that are solids, the ionic liquid was heated to melt the solid, the calculated amount of protic solvent was added to the ionic liquid, mixed and a fixed quantity of cellulose was added. Heating was conducted in a sealed vial at 105° C. for samples that were not stirred and at 105° C. with stirring. In some cases dissolution was conducted as low as 25° C. if the ionic liquid and the protic agent are liquid at room temperature.

Mixtures of the protic agent and the ionic liquid dissolve cellulose over a wide temperature range. In one embodiment cellulose is dissolved in the range of 25° C. to 180° C. In another embodiment cellulose is dissolved over the range of 80° C. to 120° C. In yet another embodiment cellulose is dissolved over a temperature range of from 100° C. to 110° C. Dissolution of cellulose can be conducted with or without stirring. The latter accelerates dissolution of cellulose. Table 3 shows the dissolution of cellulose in a mixture of protic solvents and ionic liquids at 105° C. For purposes of this application, cellulose is considered dissolved when the solution is visually examined and the solution is cloudy or clear. In the table, molar ratio refers to the ratio of the protic solvent to the ionic liquid. For example a molar ratio of 0.13 for the mixture of acetic and EMIMCl (1-ethyl-3-methyl imidazolium chloride) means that 0.13 moles of acetic acid and one mole of EMIMCl dissolve cellulose at 105° C. in two hours 105° C. The molar ratio of protic intercrystalline swelling agent to ionic liquid may be from 0.05 to 1.5 moles of dipolar aprotic intercrystalline swelling agent to 1 mole of ionic liquid.

In some embodiments the dissolution time for a mixture of protic agents and ionic liquids may be 5 minutes to 24 hours. In some embodiments the dissolution time for a mixture of protic agents and ionic liquids may be 5 minutes to 5 hours. In some embodiments the dissolution time for a mixture of protic agents and ionic liquids may be 5 minutes to 2 hours. In some embodiments the dissolution time for a mixture of protic agents and ionic liquids may be 5 minutes to 1 hour.

Cellulose dissolved in the protic agent and the ionic liquid or the dipolar aprotic agent and the ionic liquid can be regenerated by precipitating the cellulose in a liquid in which it is immiscible such as water, alcohol, mixtures thereof, a mixture of a protic agent and an ionic liquid, or with a high ratio of a protic or dipolar aprotic agent to the ionic liquid. Preferably the liquid non-solvent is miscible with water but other non-solvents such methanol, ethanol, acetonitrile, an ether such as furan or dioxane or a ketone can be used. The advantage of water is that the process avoids the use of a volatile organic compound and regeneration does not require the use of volatile organic solvents. Thus the ionic liquid can be dried and reused after regeneration. In one embodiment water is used as the non-solvent for regeneration of the cellulose. Mixtures of from 0% by weight non-solvent/solvent to about 50% by weight non-solvent/solvent can be used for regenerating the cellulose from the ionic liquid solution. For example, up to a 50% by weight water and 50% by weight 1-ethyl-3-methyl imidazolium acetate can be used in the regeneration process.

In the following tables the numbers in parenthesis are the grams of material. For example in Table 1 DMSO (8.25) means 8.25 grams of DMSO.

In table 3, two molar ratios are given for BTMAH. There is water in BTMAH. The first molar ratio is for moles of water to a mole of ionic liquid. The second is the molar ratio of water to BTMAH. BTMAH is Benzyltrimethylammonium hydroxide, 40% in water.

TABLE 1

Cellulose Dissolution In Ionic Liquids With Dipolar aprotic Agents At 105° C.

| Dipolar aprotic Agent (g) | Ionic Liquid, (g) | Molar Ratio | Solubility, 1 Hr. | 2 Hr. | 20 Hr. |
|---|---|---|---|---|---|
| DMSO (8.25) | EMIMAc (1.75) | 10.27 | yes | | |
| DMSO (8.5) | EMIMAc (1.5) | 12.35 | no | dissolved in 5 hr. | |
| DMSO (9) | EMIMAc (1) | 21 | no | cloudy | |
| DMSO (4) | EMIMCl (6) | 1.25 | cloudy | | |
| DMSO (5) | EMIMCl (5) | 1.88 | incomplete | | |
| DMSO (8) | EMIMCl (2) | 7.51 | incomplete | | |
| DMSO (4) | BMIMCl (6) | 1.49 | yes | | |
| DMSO (4.5) | BMIMCl (5.5) | 1.83 | yes | | |
| DMSO (5) | BMIMCl (5) | 2.24 | incomplete | incomplete | incomplete |
| DMSO (8) | BMIMCl (2) | 8.94 | no | no | |

TABLE 2

Cellulose Dissolution in Ionic Liquids With Dipolar aprotic Agents At 105° C. With Stirring

| Additive | Ionic Liquid | Molar ratio | Solubility, 15 min. | Solubility, 30 min. | Solubility, 45 min. |
|---|---|---|---|---|---|
| DMSO (3) | EMIMCl (7) | 0.8 | yes | | |
| DMSO (4) | EMIMCl (6) | 1.25 | cloudy | cloudy | yes |
| DMSO (5) | EMIMCl (5) | 1.88 | incomplete | incomplete | incomplete |
| DMAc (3.5) | EMIMCl (6.5) | 0.91 | cloudy | cloudy | yes |
| DMAc (4) | EMIMCl (6) | 1.12 | no | mostly | mostly |
| DMF (3.5) | EMIMCl (6.5) | 1.08 | mostly | yes | yes |
| DMF (4) | EMIMCl (6) | 1.34 | no | no | mostly |
| NMP (4) | EMIMCl (6) | 0.99 | Yes | yes | |
| NMP (5) | EMIMCl (5) | 1.48 | mostly | yes | |
| NMP (4.5) | EMIMCl (5.5) | 1.81 | no | no | no |
| DMSO (4.5) | BMIMCl (5.5) | 1.83 | Yes | yes | yes |
| DMSO (5) | BMIMCl (5) | 2.24 | incomplete | incomplete | incomplete |
| DMAc (3.5) | BMIMCl (6.5) | 1.7 | mostly | yes | |
| DMAc (4) | BMIMCl (6) | 1.34 | no | no | yes |
| DMAc (4.5) | BMIMCl (5.5) | 1.64 | no | no | incomplete |
| DMF (3.5) | BMIMCl (6.5) | | no | no | yes |
| DMF (4) | BMIMCl (6) | | no | no | incomplete |
| NMP (3) | BMIMCl (7) | 0.76 | yes | | |

TABLE 2-continued

| Cellulose Dissolution in Ionic Liquids With Dipolar aprotic Agents At 105° C. With Stirring | | | | | |
|---|---|---|---|---|---|
| Additive | Ionic Liquid | Molar ratio | Solubility, 15 min. | Solubility, 30 min. | Solubility, 45 min. |
| NMP (4) | BMIMCl (6) | 1.17 | no | yes | yes |
| NMP (4.5) | BMIMCl (5.5) | 1.44 | no | yes | yes |
| NMP (5) | BMIMCl (5) | 1.76 | incomplete | incomplete | incomplete |

TABLE 3

| Cellulose Dissolution in Ionic Liquids With Protic Agents At 105° C. | | | | | |
|---|---|---|---|---|---|
| Protic Additive | Ionic Liquid | Molar Ratio* | 1 Hr. | 2 Hr. | 20 Hr. |
| Water (0) | EMIMCl (10) | | yes | yes | yes |
| Water (0.5) | EMIMCl (9.5) | 0.43 | no | yes | yes |
| Water (0.75) | EMIMCl (9.25) | 0.66 | no | no | no |
| Acetic Acid (1) | EMIMAc (9) | 0.32 | yes | yes | yes |
| Acetic Acid (1.5) | EMIMAc (8.5) | 0.51 | yes | yes | yes |
| Acetic Acid (2) | EMIMAc (8) | 0.72 | no | No, 6 hr. | not at 6 hr. |
| Acetic Acid (0.5) | EMIMCl (9.5) | 0.13 | No- | yes | yes |
| Acetic Acid (1) | EMIMCl (9) | 0.27 | no | no | incomplete |
| BTMAH(1) | EMIMAc (9) | 0.61/0.05* | yes | | |
| BTMAH(1.5) | EMIMAc (8.5) | 0.87/0.07* | no | yes | |
| BTMAH(1.75) | EMIMAc (8.25) | 1/.09* | no | 4 hr. | |
| BTMAH(2) | EMIMAc (8) | 1.38/0.11* | incomplete | incomplete | incomplete |
| Acetic Acid (0.5) | EMIMCl (9.5) | 0.13 | no | yes | |
| Acetic Acid (1) | EMIMCl (9) | 0.27 | no | no | 50% |
| Water (0.25) | BMIMCl (9.75) | 0.25 | cloudy | cloudy | cloudy |
| Water (0.5) | BMIMCl (9.5) | 0.51 | incomplete | incomplete | incomplete |
| Acetic Acid (0.25) | BMIMCl (9.75) | 0.07 | Yes (a) | Yes (b) | Yes (c) |
| Acetic Acid (0.5) | BMIMCl (9.5) | 0.15 | no (a) | Yes (b) | Yes (c) |
| Acetic Acid (0.75) | BMIMCl (9.25) | 0.24 | cloudy | cloudy | cloudy |
| Acetic Acid (1.0) | BMIMCl (9.0) | 0.32 | No (a) | No (b) | No (c) |

(a) solubility in 90 min.
(b) solubility in 150 min.
(c) solubility in 22 hr.
*water/BTMAH

TABLE 4

| Effect Of Shear Rate on Solution Viscosity | | |
|---|---|---|
| Shear Rate | 2% Peach ® pulp in EMIMAc Viscosity | 2% Peach ® pulp in EMIMAc + DMSO 1/9 Viscosity |
| 0.15 | 18.44 | 0.27 |
| 0.27 | 18.28 | 0.28 |
| 0.48 | 17.75 | 0.32 |
| 0.86 | 16.91 | 0.31 |
| 1.54 | 16.00 | 0.31 |

TABLE 4-continued

| Effect Of Shear Rate on Solution Viscosity | | |
|---|---|---|
| Shear Rate | 2% Peach ® pulp in EMIMAc Viscosity | 2% Peach ® pulp in EMIMAc + DMSO 1/9 Viscosity |
| 2.75 | 15.17 | 0.32 |
| 4.93 | 14.29 | 0.32 |
| 8.82 | 13.36 | 0.32 |
| 15.80 | 12.45 | 0.32 |
| 28.30 | 11.25 | 0.31 |

TABLE 4-continued

| Effect Of Shear Rate on Solution Viscosity | | |
|---|---|---|
| Shear Rate | 2% Peach ® pulp in EMIMAc Viscosity | 2% Peach ® pulp in EMIMAc + DMSO 1/9 Viscosity |
| 50.69 | 9.81 | 0.31 |
| 90.78 | 8.23 | 0.30 |
| 162.56 | 6.62 | 0.29 |
| 291.11 | 5.10 | 0.27 |
| 521.40 | 3.83 | 0.24 |

TABLE 5

| Effect Of Shear Rate on Solution Viscosity | | | | | |
|---|---|---|---|---|---|
| Shear Rate | 1% Peach ® pulp in BMIMCl Viscosity | 1% Peach ® pulp in BMIMCl/NMP 7/3 Viscosity | 1% Peach ® pulp in BMIMCl/DMSO 7/3 Viscosity | 1% Peach ® pulp in BMIMCl/DMAc 7/3 Viscosity | 1% Peach ® pulp in BMIMCl/DMF 7/3 Viscosity |
| 0.15 | 11.07 | 7.31 | 5.78 | 3.93 | 2.78 |
| 0.27 | 11.37 | 7.30 | 5.72 | 3.88 | 2.77 |
| 0.48 | 11.57 | 7.16 | 5.62 | 3.84 | 2.75 |
| 0.86 | 11.77 | 6.95 | 5.54 | 3.78 | 2.73 |
| 1.54 | 11.86 | 6.62 | 5.38 | 3.69 | 2.69 |
| 2.75 | 11.74 | 6.27 | 5.16 | 3.56 | 2.63 |
| 4.93 | 11.69 | 5.89 | 4.90 | 3.42 | 2.55 |
| 8.82 | 11.37 | 5.47 | 4.54 | 3.24 | 2.43 |
| 15.80 | 11.20 | 4.96 | 4.14 | 2.98 | 2.27 |
| 28.30 | 11.23 | 4.39 | 3.68 | 2.70 | 2.08 |
| 50.69 | 11.26 | 3.80 | 3.26 | 2.41 | 1.88 |
| 90.78 | 11.24 | 3.21 | 2.85 | 2.11 | 1.65 |
| 162.56 | 11.10 | 2.66 | 2.42 | 1.80 | 1.42 |
| 291.11 | 10.70 | 2.18 | 2.01 | 1.51 | 1.20 |
| 521.40 | 9.34 | 1.75 | 1.64 | 1.25 | 0.99 |

TABLE 6

| Effect Of Shear Rate on Solution Viscosity | | | | |
|---|---|---|---|---|
| Shear Rate | 1% Peach ® pulp in EMIMCl Viscosity | 1% Peach ® pulp in EMIMCl/NMP 7/3 Viscosity | 1% Peach ® pulp in EMIMCl/DMSO 7/3 Viscosity | 1% Peach ® pulp in EMIMCl/DMF 7/3 Viscosity |
| 0.15 | 21.27 | 4.11 | 4.23 | 1.48 |
| 0.27 | 21.44 | 4.05 | 4.17 | 1.52 |
| 0.48 | 21.36 | 3.95 | 4.06 | 1.50 |
| 0.86 | 21.22 | 3.83 | 3.97 | 1.46 |
| 1.54 | 20.75 | 3.68 | 3.87 | 1.42 |
| 2.75 | 19.84 | 3.55 | 3.75 | 1.37 |
| 4.93 | 18.98 | 3.41 | 3.58 | 1.33 |
| 8.82 | 17.93 | 3.23 | 3.39 | 1.27 |
| 15.80 | 16.92 | 3.01 | 3.12 | 1.21 |
| 28.30 | 16.13 | 2.72 | 2.81 | 1.14 |
| 50.69 | 15.49 | 2.41 | 2.48 | 1.05 |
| 90.78 | 14.75 | 2.12 | 2.15 | 0.95 |
| 162.56 | 13.73 | 1.81 | 1.84 | 0.84 |
| 291.11 | 12.05 | 1.52 | 1.53 | 0.73 |
| 521.40 | 9.62 | 1.26 | 1.26 | 0.63 |

EXAMPLE 1

A dope for forming films was made by dissolving a Kraft pulp, Peach® pulp having an average degree of polymerization of about 760 and a hemicellulose content of about 12% (6.7% xylan, 5.2% mannan) in 1-ethyl-3-methylimidazolium acetate/water or benzyltrimethyl ammonium hydroxide (BTMAH) mixture at 105° C. with stirring. The solid concentration in the dope was about 13.2% by weight. The dope was cast on a glass plate to make film, which is regenerated in water, washed, air dried for analysis. X-ray diffraction indicated that samples treated with IL containing 10% H2O still has cellulose I structure while other films have cellulose II structure (regenerated form). X-ray diffraction measurements of fiber samples were recorded on a Shimadadzu X-ray diffractometer using Ni— filtered, CuKα radiation, a voltage of 40 kV and a current of 40 mA. The scanning rate employed was 5 degrees per min over a 5 degree to 40 degree 2θ (diffraction angle) range. The crystallinity index was determined by Segal's formula (Segal L C, Martin A E, Conrad C M. 1959 *Textile Res J.* 29: 786-794). The % Crystallinity Index was calculated as $((I_{020}-I_{am})/I_{020})\times100$, where $I_{020}$=intensity at Lowest 2θ value near 18 degrees. The properties of the film are given below.

| Solution | | Cellulose Pulp | | Film Properties | | |
|---|---|---|---|---|---|---|
| Cellulose Wt % | cosolvent | R10 % | R18 % | Xylan % | Mannan % | Crystallinity index |
| 13.2 | 10% H2O | 83 | 87 | 4.22 | 4.26 | 0.67 |
| 13.2 | 5% H2O | 83 | 87 | 5.66 | 4.88 | 0.57 |
| 13.2 | 10% BTMAH | 83 | 87 | 5.53 | 4.75 | 0.58 |

EXAMPLE 2

A dope for forming films was made by dissolving cellulose acetate, (6.6 g) and 6.6 g of a Kraft pulp, Peach® having an average degree of polymerization of about 760 and a hemicellulose content of about 12% (6.7% xylan, 5.2% mannan) in 1-ethyl-3-methylimidazolium acetate/DMSO mixture (43.4 g/43.4 g) at 105° C. with stirring. The solid concentration in the dope was about 13.2% by weight. The dope was cast on a glass plate to make film, which is regenerated in water, washed, air dried for analysis. Cellulose acetate lowers the film crystallinity.

As used in this application one method for measuring the degraded shorter molecular weight components in the pulp is by the $R_{18}$ and $R_{10}$ content as described in TAPPI 235. $R_{10}$ represents the residual undissolved material that is left extraction of the pulp with 10 percent by weight caustic and $R_{18}$ represents the residual amount of undissolved material left after extraction of the pulp with an 18% caustic solution. Generally, in a 10% caustic solution, hemicellulose and chemically degraded short chain cellulose are dissolved and removed in solution. In contrast, generally only hemicellulose is dissolved and removed in an 18% caustic solution. Thus, the difference between the $R_{10}$ value and the $R_{18}$ value, ($\Delta R=R_{18}-R_{10}$), represents the amount of chemically degraded short chained cellulose that is present in the pulp sample. Hemicellulose is measured as the sum of the xylan and mannan content and was determined by the method described below for sugar analysis. As defined herein degree of polymerization (abbreviated as D.P.) refers to the number of anhydro-D-glucose units in the cellulose chain. D.P. was determined by ASTM Test 1795-96.

The properties of the film are given below.

| Solution | | Pulp | | | | | |
|---|---|---|---|---|---|---|---|
| Cellulose Wt % | DP | Pulp Properties R10 % | R18 % | Film Properties Xylan % | Mannan % | Insoluble % | Crystallinity index |
| 6.6 | 760 | 83 | 87 | 1.70 | 1.68 | 0.4 | 0.51 |

EXAMPLE 3

A dope for forming filaments was made by dissolving a wood chip in 1-ethyl-3-methylimidazolium acetate (EMIMAc) or its mixture with DMSO mixture at 105° C. with stirring. The chip concentration in the dope was about 13% by weight. The dope was cast on a glass plate to make film, which is regenerated in water, washed, air dried for x-ray analysis. Wood chips, approximately 1.3 g dissolved in a mixture of 5 g of EMIMAc/5 g DMSO had the lowest crystallinity (0.27), while those treated with EMIMAc had a crystallinity index of 0.35 and the untreated chip has a crystallinity index of 0.60. This would suggest that relative to the crystallinity index of the chip, the mixed solvent system of EMIMAc/DMSO has a higher impact on the crystallinity region than does the EMIMAc alone.

Sugar Analysis

This method is applicable for the preparation and analysis of pulp and wood samples for the determination of the amounts of the following pulp sugars: fucose, arabinose, galactose, rhamnose, glucose, xylose and mannose using high performance anion exchange chromatography and pulsed amperometric detection (HPAEC/PAD).

Summary of Method

Polymers of pulp sugars are converted to monomers by hydrolysis using sulfuric acid. Samples are ground, weighed, hydrolyzed, diluted to 200-mL final volume, filtered, diluted again (1.0 mL+8.0 mL $H_2O$) in preparation for analysis by HPAEC/PAD.

Sampling, Sample Handling and Preservation

Wet samples are air-dried or oven-dried at 25±5° C.

Equipment Required

Autoclave, Market Forge, Model #STM-E, Serial #C-1808

100×10 mL Polyvials, septa, caps, Dionex Cat #55058

Gyrotory Water-Bath Shaker, Model G76 or some equivalent.

Balance capable of weighing to ±0.01 mg, such as Mettler HL52 Analytical Balance.

Intermediate Thomas-Wiley Laboratory Mill, 40 mesh screen.

NAC 1506 vacuum oven or equivalent.

0.45-μ GHP filters, Gelman type A/E, (4.7-cm glass fiber filter discs, without organic binder)

Heavy-walled test tubes with pouring lip, 2.5×20 cm.

Comply SteriGage Steam Chemical Integrator

GP 50 Dionex metal-free gradient pump with four solvent inlets

Dionex ED 40 pulsed amperometric detector with gold working electrode and solid state reference electrode Dionex autosampler AS 50 with a thermal compartment containing the columns, the ED 40 cell and the injector loop Dionex PC10 Pneumatic Solvent Addition apparatus with 1-L plastic bottle 3 2-L Dionex polyethylene solvent bottles with solvent outlet and helium gas inlet caps CarboPac PA1 (Dionex P/N 035391) ion-exchange column, 4 mm×250 mm CarboPac PA1 guard column (Dionex P/N 043096), 4 mm×50 mm Millipore solvent filtration apparatus with Type HA 0.45 u filters or equivalent Reagents Required All references to $H_2O$ is Millipore $H_2O$ 72% Sulfuric Acid Solution (H2SO4)—Transfer 183 mL of water into a 2-L Erlenmeyer flask. Pack the flask in ice in a Rubbermaid tub in a hood and allow the flask to cool. Slowly and cautiously pour, with swirling, 470 mL of 96.6% $H_2SO_4$ into the flask. Allow solution to cool. Carefully transfer into the bottle holding 5-mL dispenser. Set dispenser for 1 mL.

J T Baker 50% sodium hydroxide solution, Cat. No. Baker 3727-01, [1310-73-2]

Dionex sodium acetate, anhydrous (82.0±0.5 grams/1 L $H_2O$), Cat. No. 59326, [127-09-3].

Standards

Internal Standards

Fucose is used for the kraft and dissolving pulp samples. 2-Deoxy-D-glucose is used for the wood pulp samples.

Fucose, internal standard. 12.00±0.005 g of Fucose, Sigma Cat. No. F 2252, [2438-80-4], is dissolved in 200.0 mL $H_2O$ giving a concentration of 60.00±0.005 mg/mL. This standard is stored in the refrigerator.

2-Deoxy-D-glucose, internal standard. 12.00±0.005 g of 2-Deoxy-D-glucose, Fluka Cat. No. 32948 g [101-77-9] is dissolved in 200.0 mL $H_2O$ giving a concentration of 60.00±0005 mg/mL. This standard is stored in the refrigerator.

Kraft Pulp Stock Standard Solution

Kraft Pulp Sugar Standard Concentrations

| Sugar | Manufacturer | Purity | g/200 mL |
|---|---|---|---|
| Arabinose | Sigma | 99% | 0.070 |
| Galactose | Sigma | 99% | 0.060 |
| Glucose | Sigma | 99% | 4.800 |
| Xylose | Sigma | 99% | 0.640 |
| Mannose | Sigma | 99% | 0.560 |

Kraft Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

Pulp Sugar Standard Concentrations for Kraft Pulps

| Fucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
|---|---|---|---|---|---|---|
| Fucose | 60.00 | 300.00 | 300.00 | 300.00 | 300.00 | 300.00 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Glucose | 24.0 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Dissolving Pulp Stock Standard Solution

Dissolving Pulp Sugar Standard Concentrations

| Sugar | Manufacturer | Purity | g/100 mL |
|---|---|---|---|
| Glucose | Sigma | 99% | 6.40 |
| Xylose | Sigma | 99% | 0.120 |
| Mannose | Sigma | 99% | 0.080 |

Dissolving Pulp Working Solution

Weigh each sugar separately to 4 significant digits and transfer to the same 200-mL volumetric flask. Dissolve sugars in a small amount of water. Take to volume with water, mix well, and transfer contents to two clean, 4-oz. amber bottles. Label and store in the refrigerator. Make working standards as in the following table.

Pulp Sugar Standard Concentrations for Dissolving Pulps

| Fucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
|---|---|---|---|---|---|---|
| Fucose | 60.00 | 300.00 | 300.00 | 300.00 | 300.00 | 300.00 |
| Glucose | 64.64 | 226.24 | 452.48 | 678.72 | 904.96 | 1131.20 |
| Xylose | 1.266 | 4.43 | 8.86 | 13.29 | 17.72 | 22.16 |
| Mannose | 0.8070 | 2.82 | 5.65 | 8.47 | 11.30 | 14.12 |

Wood Pulp Stock Standard Solution

Wood Pulp Sugar Standard Concentrations

| Sugar | Manufacturer | Purity | g/200 mL |
|---|---|---|---|
| Fucose | Sigma | 99% | 12.00 |
| Rhamnose | Sigma | 99% | 0.0701 |

Dispense 1 mL of the fucose solution into a 200-mL flask and bring to final volume. Final concentration will be 0.3 mg/mL.

Wood Pulp Working Solution

Use the Kraft Pulp Stock solution and the fucose and rhamnose stock solutions. Make working standards as in the following table.

Pulp Sugar Standard Concentrations for Kraft Pulps

| 2-Deoxy-D-glucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
|---|---|---|---|---|---|---|
| 2-DG | 60.00 | 300.00 | 300.00 | 300.00 | 300.00 | 300.00 |
| Fucose | 0.300 | 1.05 | 2.10 | 3.15 | 4.20 | 6.50 |
| Arabinose | 0.36 | 1.2 | 2.5 | 3.8 | 5.00 | 6.508 |
| Galactose | 0.30 | 1.1 | 2.2 | 3.30 | 4.40 | 5.555 |
| Rhamnose | 0.3500 | 1.225 | 2.450 | 3.675 | 4.900 | 6.125 |

-continued

| 2-Deoxy-D-glucose Sugar | mg/mL | mL/200 mL 0.70 ug/mL | mL/200 mL 1.40 ug/mL | mL/200 mL 2.10 ug/mL | mL/200 mL 2.80 ug/mL | mL/200 mL 3.50 ug/mL |
|---|---|---|---|---|---|---|
| Glucose | 24.00 | 84 | 168.0 | 252.0 | 336.0 | 420.7 |
| Xylose | 3.20 | 11 | 22.0 | 33.80 | 45.00 | 56.05 |
| Mannose | 2.80 | 9.80 | 19.0 | 29.0 | 39.0 | 49.07 |

Procedure

Sample Preparation

Grind 0.2±05 g sample with Wiley Mill 40 Mesh screen size. Transfer 200 mg of sample into 40-mL Teflon container and cap. Dry overnight in the vacuum oven at 50° C. Add 1.0 mL 72% $H_2SO_4$ to test tube with the Brinkman dispenser. Stir and crush with the rounded end of a glass or Teflon stirring rod for one minute. Turn on heat for Gyrotory Water-Bath Shaker. The settings are as follows:

Heat: High

Control Thermostat: 7° C.

Safety thermostat: 25° C.

Speed: Off

Shaker: Off

Place the test tube rack in gyrotory water-bath shaker. Stir each sample 3 times, once between 20-40 min, again between 40-60 min, and again between 60-80 min. Remove the sample after 90 min. Dispense 1.00 mL of internal standard (Fucose) into Kraft samples.

Tightly cover samples and standard flasks with aluminum foil to be sure that the foil does not come off in the autoclave.

Place a Comply SteriGage Steam Chemical Integrator on the rack in the autoclave. Autoclave for 60 minutes at a pressure of 14-16 psi (95-105 kPa) and temperature >260° F. (127° C.).

Remove the samples from the autoclave. Cool the samples. Transfer samples to the 200-mL volumetric flasks. Add 2-deoxy-D-glucose to wood samples. Bring the flask to final volume with water.

For Kraft and Dissolving Pulp Samples:

Filter an aliquot of the sample through GHP 0.45μ filter into a 16-mL amber vial.

For Wood Pulp Samples:

Allow particulates to settle. Draw off approximately 10 mL of sample from the top, trying not to disturb particles and filter the aliquot of the sample through GHP 0.45μ filter into a 16-mL amber vial. Transfer the label from the volumetric flask to the vial. Add 1.00 mL aliquot of the filtered sample with to 8.0 mL of water in the Dionex vial. Samples are run on the Dionex AS/500 system. See Chromatography procedure below.

Chromatography Procedure

Solvent Preparation

Solvent A is distilled and deionized water (18 meg-ohm), sparged with helium while stirring for a minimum of 20 minutes, before installing under a blanket of helium, which is to be maintained regardless of whether the system is on or off.

Solvent B is 400 mM NaOH. Fill Solvent B bottle to mark with water and sparge with helium while stirring for 20 minutes. Add appropriate amount of 50% NaOH.

(50.0 g NaOH/100 g solution)*(1 mol NaOH/40.0 g NaOH)*(1.53 g solution/1 mL solution)*(1000 mL solution/1 L solution)=19.1 M NaOH in the container of 50/50 w/w NaOH.

0.400 M NaOH*(1000 mL $H_2O$/19.1 M NaOH)=20.8 mL NaOH

Round 20.8 mL Down for Convenience:

19.1 M*(20.0 mL×mL)=0.400 M NaOH x mL=956 mL

Solvent D is 200 mM sodium acetate. Using 18 meg-ohm water, add approximately 450 mL deionized water to the Dionex sodium acetate container. Replace the top and shake until the contents are completely dissolved. Transfer the sodium acetate solution to a 1-L volumetric flask. Rinse the 500-mL sodium acetate container with approximately 100 mL water, transferring the rinse water into the volumetric flask. Repeat rinse twice. After the rinse, fill the contents of the volumetric flask to the 1-L mark with water. Thoroughly mix the eluent solution. Measure 360±10 mL into a 2-L graduated cylinder. Bring to 1800±10 mL. Filter this into a 2000-mL sidearm flask using the Millipore filtration apparatus with a 0.45 pm, Type HA membrane. Add this to the solvent D bottle and sparge with helium while stirring for 20 minutes.

The postcolumn addition solvent is 300 mM NaOH. This is added postcolumn to enable the detection of sugars as anions at pH>12.3. Transfer 15±0.5 mL of 50% NaOH to a graduated cylinder and bring to 960±10 mL in water.

(50.0 g NaOH/100 g Solution)*(1 mol NaOH/40.0 g NaOH)*(1.53 g Solution/1 mL Solution) (1000 mL Solution/1 L solution)=19.1 M NaOH in the container of 50/50 w/w NaOH.

0.300 M NaOH*(1000 ml H2O/19.1 M NaOH)=15.7 mL NaOH

Round 15.7 mL Down:

19.1M*(15.0 mL/x mL)=0.300 M NaOH x mL=956 mL (Round 956 mL to 960 mL. As the pH value in the area of 0.300 M NaOH is steady, an exact 956 mL of water is not necessary.)

Set up the AS 50 schedule.

Injection volume is 5 uL for all samples, injection type is "Full", cut volume is 10 uL, syringe speed is 3, all samples and standards are of Sample Type "Sample". Weight and Int. Std. values are all set equal to 1.

Run the Five Standards at the Beginning of the Run in the Following Order:

STANDARD A1 DATE

STANDARD B1 DATE

STANDARD C1 DATE

STANDARD D1 DATE

STANDARD E1 DATE

After the last sample is run, run the mid-level standard again as a continuing calibration verification Run the control sample at any sample spot between the beginning and ending standard runs.

Run the samples.

Calculations

Calculations for Weight Percent of the Pulp Sugars $$\text{Normalized area for sugar} = \frac{(\text{Area sugar}) * (\mu\text{g/mL fucose})}{(\text{Area Fucose})}$$

$$IS \text{ Corrected sugar amount}(\mu\text{g/mL} = \frac{\left(\begin{array}{c}(\text{Normalized area for sugar}) - \\ (\text{intercept})\end{array}\right)}{(\text{slope})}$$

$$\text{Monomer Sugar Weight \%} = \frac{\begin{array}{c}IS- \\ \text{Corrected sugar amt}(\mu\text{g/mL})\end{array}}{\text{Sample wt.(mg)}} * 20$$

Example for Arabinose:

$$\text{Monomer Sugar Weight \%} = \frac{0.15\ \mu\text{g/mL arabinose}}{70.71\ \text{mg arabinose}} * 20 = 0.043\%$$

$$\text{Polymer Weight \%} = (\text{Weight \% of Sample sugar}) * (0.88)$$

Example for Arabinan:

Polymer Sugar Weight %=(0.043 wt %)*(0.88)=0.038 Weight

Note: Xylose and arabinose amounts are corrected by 88% and fucose, galactose, rhamnose, glucose, and mannose are corrected by 90%.

Report results as percent sugars on an oven-dried basis.

The embodiments of this invention, including the examples, are exemplary of numerous embodiments that may be made of this invention. It is contemplated that numerous other configurations of the process may be used and the equipment used in the process may be selected from numerous sources other than those specifically disclosed. In short, it is the applicant's intention that the scope of the patent issuing herefrom will be limited only by the scope of the appended claims

The invention claimed is:

1. A method for dissolving cellulose comprising admixing a cellulose based raw material with a mixture of dimethyl sulfoxide and 1-ethyl-3-methyl imidazolium acetate at a temperature of 25° C. to 180° C. for a time sufficient to dissolve the cellulose based raw material, wherein the molar ratio of the dimethyl sulfoxide to 1-ethyl-3-methyl imidazolium acetate is in the range of 0.5 to 25 moles of dimethyl sulfoxide to 1 mole of 1-ethyl-3-methyl imidazolium acetate.

2. The method of claim 1 wherein the cellulose based raw material is wood chips, wood pulp, kenaf or straw.

3. The method of claim 2 wherein the wood pulp is chemical wood pulp, kraft wood pulp, sulfite wood pulp, mechanical wood pulp, thermomechanical wood pulp, or chemithermomechanical wood pulp.

4. The method of claim 1 wherein the temperature range is 80° C. to 120° C.

5. The method of claim 1 wherein the temperature range is 100° C. to 110° C.

6. The method of claim 1 wherein the molar ratio is 0.5 to 15 moles of dimethyl sulfoxide to 1 mole of 1-ethyl-3-methyl-imidazolium acetate.

7. The method of claim 1 wherein the time is 5 minutes to 24 hours.

8. The method of claim 1 wherein the time is 5 minutes to 1 hour.

9. The method of claim 1 further comprising regenerating the dissolved cellulose.

10. The method of claim 1 wherein the molar ratio is 5 to 25 moles of dimethyl sulfoxide to 1 mole of 1-ethyl-3-methyl imidazolium acetate.

11. The method of claim 1 wherein the molar ratio is 5 to 15 moles of dimethyl sulfoxide to 1 mole of 1-ethyl-3-methyl imidazolium acetate.

* * * * *